(12) United States Patent
Mayr-Kohn

(10) Patent No.: US 7,077,077 B2
(45) Date of Patent: Jul. 18, 2006

(54) COOLABLE ANNULAR SUPPORT FOR INTENTIONALLY COOLED PISTON RINGS AND METHOD FOR THE PRODUCTION THEREOF

(75) Inventor: Susanne Mayr-Kohn, Stuttgart (DE)

(73) Assignee: A.I.M.L. GmbH (DE)

( * ) Notice: Subject to any disclaimer, the term of this patent is extended or adjusted under 35 U.S.C. 154(b) by 351 days.

(21) Appl. No.: 10/483,042

(22) PCT Filed: Jul. 4, 2002

(86) PCT No.: PCT/DE02/02498

§ 371 (c)(1),
(2), (4) Date: Jan. 6, 2004

(87) PCT Pub. No.: WO03/004851

PCT Pub. Date: Jan. 16, 2003

(65) Prior Publication Data

US 2004/0154558 A1 Aug. 12, 2004

(30) Foreign Application Priority Data

Jul. 6, 2001 (DE) ............................. 101 33 724
Jul. 6, 2001 (DE) ............................. 201 11 527 U

(51) Int. Cl.
*F02F 3/06* (2006.01)
(52) U.S. Cl. ................................. 123/41.35
(58) Field of Classification Search ........ 123/41.35, 123/41.34, 41.01; 29/888.07
See application file for complete search history.

(56) References Cited

U.S. PATENT DOCUMENTS

| | | | | |
|---|---|---|---|---|
| 4,120,081 A | * | 10/1978 | Rosch et al. ........ | 29/888.045 |
| 4,368,697 A | * | 1/1983 | Moebus .............. | 123/41.35 |
| 4,587,932 A | * | 5/1986 | Moebus .............. | 123/41.35 |
| 5,947,065 A | * | 9/1999 | Bing et al. .......... | 123/41.35 |

FOREIGN PATENT DOCUMENTS

| | | |
|---|---|---|
| DE | 198 38 529 | 11/1999 |
| DE | 19838529 | * 11/1999 |
| DE | 199 40 440 | 5/2001 |
| EP | 01041648 | 10/1987 |
| EP | 0916832 | 5/1999 |

* cited by examiner

*Primary Examiner*—Henry C. Yuen
*Assistant Examiner*—Jason Benton
(74) *Attorney, Agent, or Firm*—Robert W Becker & Associates; Robert W Becker

(57) ABSTRACT

The invention relates to a coolable annular support (1) for internally cooled piston rings, comprising an annular body (2) embodied as a circular ring and a cooling channel plate (3), the cooling channel plate (3) being a component of the cooling channel, and a method for the production thereof. The components forming the annular body (2) and the cooling channel plate (3) are connected together by means of laser beams from at least one laser in a continuous wave operation. The cooling channel plate (3) is U-shaped and has openings (6) which act as an inlet or an outlet for the cooling material in conjunction with tubular-shaped bodies. It is possible to simultaneously compensate variations in volume by different air temperatures during welding. At least one edge of the annular body (2) and the cooling channel plate form a cavity (5) for the cooling material by connecting the end areas of the limbs of the cooling channel plate to said edge of the annular body (2). The connections of the annular body (2) and the cooling channel plate (3) takes place by means of one or more overlapping weld seams (4), so that a sealing connection between said two components is guaranteed.

6 Claims, 3 Drawing Sheets

COOLABLE ANNULAR SUPPORT FOR INTENTIONALLY COOLED PISTON RINGS AND METHOD FOR THE PRODUCTION THEREOF

BACKGROUND OF THE INVENTION

The invention relates to coolable annular supports for internally cooled piston rings, comprising an annular body embodied as a circular ring, and a cooling channel plate, whereby the cooling channel plate is a part of the cooling channel, and to methods for the production thereof.

DE 40 40 611 C2 (jet piston cooling) and DE 44 38 703 A1 (light metal or aluminum piston with cooling channel for internal combustion engines) describe a piston cooling according to which a hollow space as a cooling chamber is disposed in the body of the piston. An additional element is not required, although therewith a not simple and economical realization of a hollow space in the body of the piston results.

DE 41 31 275 C2 (built-up liquid-cooled piston) describes a coolable piston that is comprised and assembled of a plurality of parts. The parts have recesses that form cooling channels and are interconnected via connection elements, such as screw connections. The production of the pistons requires assembly, and due to the use of positive connections, higher expenses are required for the sealing of the cooling channels. In DE 42 08 037 A1 (multi-part, cooled piston for internal combustion engines) the cooling channel is formed by a groove in the piston body that is closed off by a two-part cup spring. The sealing tightness is supposed to be ensured by the cup spring, which again requires increased structural expenses.

In DE 197 01 085 A1 (method and arrangement for the production of an annular support piston), a cooling channel is formed behind an annular support. For this purpose, a core for the formation of the cooling channel is introduced into the mold, and the channel is closed off toward the outside by the introduction of the annular support. Again, increased expenses are necessary for sealing the cooling channel.

Finally, in DE 199 33 036 A1 (cooling channel piston for an internal combustion engine), a cooling channel is formed from an annular support component having two grooves, and the piston itself. The annular support component must again be connected with the piston in a tight or sealed manner so that no coolant can pass into the combustion chamber.

The invention is based on the problem of economically and conveniently producing, with high quality, sealed, coolable annular supports for internally cooled piston rings.

SUMMARY OF THE INVENTION

The coolable annular supports for internally cooled piston rings, which supports comprise an annular body embodied as a circular ring, and a cooling channel plate, whereby the cooling channel plate is a part of the cooling channel, and the method for producing the same, are characterized in particular by a straightforward operability. The components in the form of the annular body and of the cooling channel plate are interconnected via laser beams of at least one laser in the cw operation. The cooling channel plate has a U-shaped configuration and is provided with a plurality of openings, advantageously in at least one leg. In conjunction with tubular bodies, these openings serve for the entry or discharge of the coolant. A further advantage resulting from the openings is that fluctuations in volume caused by different temperatures of the air during the welding do not, to the greatest extent possible, lead to cracks or gaps of the weld seam, annular body and/or cooling channel plate that is to be cooled. The different air pressures can be equalized with the atmosphere by the openings.

At least one edge of the annular body, and the cooling channel plate, form a hollow space for the coolant by the connection of the end regions of the legs of the cooling channel plate with this edge of the annular body. In this way, a very straightforward and economical realization of the coolable annular support for internally cooled piston rings results.

The connections of the annular body and of the cooling channel plate are effected via a plurality of weld seams, thus ensuring a tight and sealed connection between these two components. For this purpose, the laser beams are guided with an offset in the direction of the respectively greatest quantity of material, so that different thermal conductivities of the components are compensated for during the formation of the respective weld seam. Furthermore, the path and movement of the coolable annular support or of the laser beams is greater that 360° relative to the coolable annular support. In so doing, the not yet completely formed weld seam is equalized during the heating-up phase after turning on the laser after positioning thereof, accompanied by simultaneous movement of the coolable annular support or of the laser beams relative to the coolable annular support. A high power that is otherwise necessary at the start is avoided, so that at the same time a danger, caused thereby, of a burning through, with holes resulting therefrom, is avoided to a maximum extent.

A further advantage results from the mounting of the tubular bodies. These represent conduits for the coolant. Otherwise, the cooling channel is bored after the casting of the piston. The boring is a cutting process, whereby chips or shavings can also pass into the cooling channel. As a result, the cooling channels of pistons manufactured in this manner must be rinsed. This is no longer necessary with the inventive annular supports, thus providing very favorable and economical conditions. A further advantage is that the tubular bodies can at the same time serve as supports for the annular support in the mold for the casting of the piston. This results in a manageable and fixed functional unit that can be placed into the casting mold of the piston. The tubular bodies end externally of the piston, so that the cooling channels provided thereby are freely accessible. For this purpose, the tubular bodies face in the direction of the crankshaft, so that inlets and outlets of the cooling fluid for the coolable annular support are easily accessible. This results in a very advantageous manufacture of pistons having coolable annular supports. A further advantage of the tubular bodies is that even during the casting of the piston with the coolable annular supports, fluctuations in volume can be compensated for. Cracks or pores caused thereby are avoided to a maximum extent.

A further advantage of the coolable annular supports is that prior to the casting of the piston they can be checked for a tight seal, so that only sealed coolable annular supports can be used during the manufacture of the piston. The result is sealed pistons.

Plate-shaped bodies that close off the openings result in a closed-off hollow space as a cooling channel. Known, coolable annular supports are thereby provided with which bores introduced into the piston and the cooling channel form the cooling channels. Tubular bodies as cooling channels can, of course, also be introduced into these bores.

A plurality of coolable annular supports, which are disposed symmetrically and parallel to one another, and which are provided with a plurality of tubular bodies that are disposed between them and that face outwardly, represent a compact construction. This can easily be placed in the mold of the piston, thus resulting in a straightforward and very economical realization of the piston having coolable annular supports. A further advantage comprises the possibility of checking the sealing tightness of the assembly. The quality of such pistons increases considerably.

An arrangement of the end regions of the tubular bodies in the cooling channel leads to a nozzle effect. The coolant enters in a directed manner and swirls in the cooling channel, thus increasing the cooling effect. This region of the tubular body can also decrease discontinuously or continuously in cross-section in the direction of the end thereof, so that assuming a uniform pressure, a considerably greater flow velocity of the coolant is achieved. The swirling or turbulence of the coolant in the cooling channel is increased considerably.

Favorable realizations of the connections between the legs of the cooling channel plate and the annular body are provided by a plurality of weld seams. The outer weld seam or seams are overlaps, so that tight connections can be produced. Cracks or gaps caused by the escape of gases from the material of the cooling channel plate and of the annular body are covered.

Advantageously, in addition to the first weld seam that connects the components, in the direction of the annular body two further overlapping weld seams and in the direction of the cooling channel plate, a weld seam that overlaps the first lap seam are applied. These serve to cover cracks and gaps that form in the annular body and in the cooling channel plate, so that a tight and sealed cooling channel is realized. These cracks and gaps result from the escape of gases from the annular bodies.

Placing the starting regions and the end regions of the weld seams at various locations of the respective arcs of the individual weld seams ensures tight and sealed connections of the cooling channel plate and of the annular bodies.

Favorable quantities of the metal powder supplied per weld seam are as follows:

quantity for the second weld seam is less than the quantity for the first weld seam, quantity for the third weld seam is less than the quantity for the second weld seam, and quantity for fourth weld seam is the same or nearly the same as the quantity for the second weld seam.

The low quantities of the weld seams two to four serve to cover cracks and/or gaps that result from the escape of gases. Lower quantities having equivalently lower capacities lead to a smaller melting or fusing of the respective material, thus reducing an escape of gases from components of these materials.

Favorable parameters are powers of greater than/equal to 900 W and less than/equal to 1800 W at advancement speeds of equal to/greater than 20 mm/s and less than/equal to 100 mm/s. As a result, the regions of the annular body and of the cooling channel plate that are to be welded are melted or fused in such a way that a tight and sealed connection results.

Embodiments of the invention are illustrated in the drawings and are described in greater detail in the following.

DESCRIPTION OF PREFERRED EMBODIMENTS

Subsequently, coolable annular supports 1 for internally cooled piston rings, and methods for the manufacture thereof, are respectively explained in greater detail together.

1. Embodiment

Figure 1:
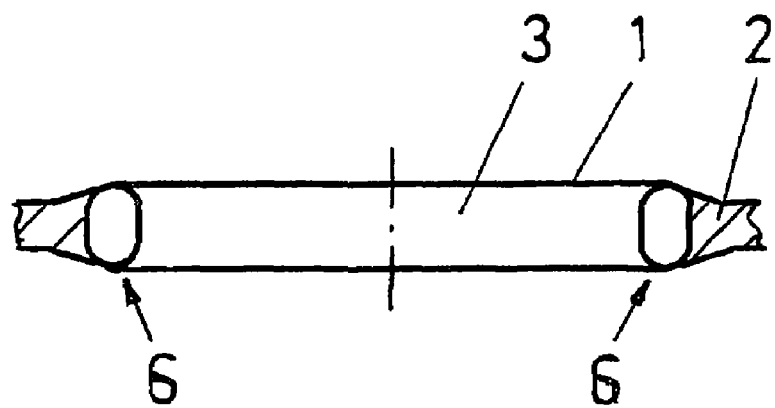
FIG. 1 a diagrammatic illustration of a coolable annular support for internally cooled piston rings, with openings for tubular bodies, FIG. 2 a diagrammatic cross-sectional illustration of a coolable annular support for internally cooled piston rings, with an opening and a tubular body, FIG. 3 a diagrammatic sectional illustration of a plurality of coolable annular supports that are interconnected via a tubular body, and FIG. 4 a cross-sectional illustration of a connection location between an end region of a leg of the cooling channel plate and the annular body.
Figure 2:
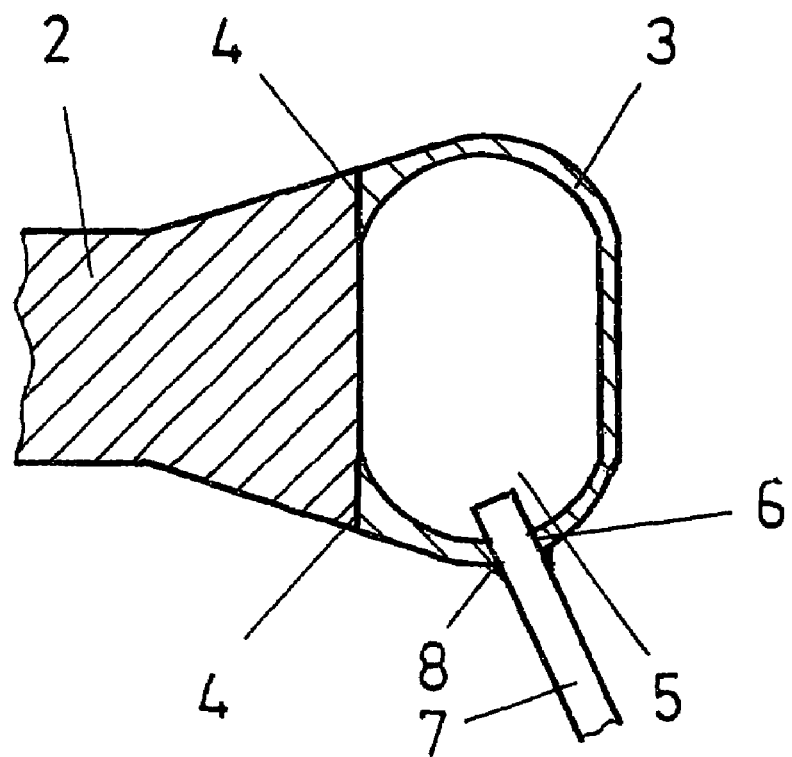

A coolable annular support 1 (illustration in FIG. 1) for internally cooled piston rings essentially comprises an annular body 2 and a cooling channel plate 3. The cooling channel plate 3 is embodied in the shape of a circular ring, and in cross-section predominantly has a U shape. The cooling channel plate 3 has openings 6, whereby these are advantageously disposed in a leg. The cooling channel plate 3 is disposed in the inner space of the annular body 2. The end regions of the legs of the cooling channel plate 3 are connected with at least one edge of the annular body 2 in such a way that the inner surface of the cooling channel plate 3, and the edge of the annular body 2, delimit an annular hollow space 5. This hollow space 5 is the cooling channel for a coolant that flows through this cooling channel. For this purpose, tubular bodies 7 are connected with the cooling channel plate 3. FIG. 2 diagrammatically illustrates a cross-section of a coolable annular support 1, including a tubular body 7. The cooling channel plate 3 and the annular body 2 are interconnected in a tight and sealed manner via weld seams 4. Employed is a Nd:YAG or high power diode laser in cw operation (cw-continuous wave, constant radiation over time) with a power of greater than/equal to 900 W and less than/equal to 1800 W. The connection of a leg of the cooling channel plate 3 to the annular body 2 comprises at least one weld seam 4. In this connection, during the welding a metal powder is supplied as an additive in an inert gas atmosphere.

The weld seam, during the supply of laser beams, predominantly or entirely results on the annular body 2 by a partial melting or fusing of the annular body 2, a partial melting or fusing of the cooling channel plate 3, and a melting or fusing of the applied metal powder.

After the positioning of the starting region of the connection location between the annular body 2 and the cooling channel plate 3, the laser is turned on. In so doing, accompanied by simultaneous starting of the movement of the annular body 2, including the cooling channel plate 3, relative to the laser beams, or in one embodiment of the movement of the laser beams relative to the annular body 2, including the cooling channel plate 3, there results, due to the starting delay of the laser beams connected therewith, weld seams 4 that are not completely formed in this region.

The path of movement of the coolable annular support 1 or of the laser beams is therefore respectively greater that 360°, whereby the start and finishes of the weld seams 4 are disposed at various locations. The speed of advancement of the annular body 2, including a cooling channel plate 3, is equal to/greater than 20 mm/s and less than/equal to 100 mm/s. A respective tubular body 7 is disposed on or in the opening 6, and by means of at least one further fifth weld seam 8, which is produced with laser beams of the laser, is connected with the leg of the cooling channel plate 3 in such a way that the cooling channel and the inner space of the tubular body 7 form a common hollow space. In this connection, the end portion of the tubular body 7 advantageously projects into the cooling channel. In so doing, the hollow space 5, as the cooling channel of a coolable annular support 1, is accessible via tubular bodies 7. The tubular bodies 7 serve for the guidance of the coolant.

2. Embodiment

A coolable annular support 1 (illustration in FIG. 1) for internally cooled piston rings essentially comprises an annular body 2 and a cooling channel plate 3. The annular body 2 is, for example, a casting, e.g. an austenitic casting as A-graphite or E-graphite. The cooling channel plate 3 is embodied in the shape of a circular ring, has in cross-section a predominantly U shape, and comprises, for example, a high-quality or stainless steel. At least one leg of the cooling channel plate 3 has openings 6. The cooling channel plate 3 is disposed in the inner space of the annular body 2. The end regions of the legs of the cooling channel plate 3 are connected with at least one edge of the annular body 2 in such a way that the inner surface of the cooling channel plate 3, and the edge of the annular body 2, delimit an annular hollow space 5. This hollow space 5 is a cooling channel for a coolant that flows through this cooling channel. For this purpose, tubular bodies 7 are connected with the cooling channel plate 3. FIG. 2 diagrammatically illustrates a cross-section of a coolable annular support 1, including a tubular body 7. The cooling channel plate 3 and the annular body 2 are interconnected in a tight and sealed manner via weld seams 4. Employed is a Nd:YAG or high power diode laser in cw operation (cw-continuous wave, constant radiation over time) having a power of greater than/equal to 900 W and less than/equal to 1800 W. The connection of a leg of the cooling channel plate 3 with the annular body 2 comprises four weld seams 4a, 4b, 4c, 4d. In this connection, during the welding for example a stainless steel powder is supplied as an additive in an inert gas atmosphere.

Figure 4:
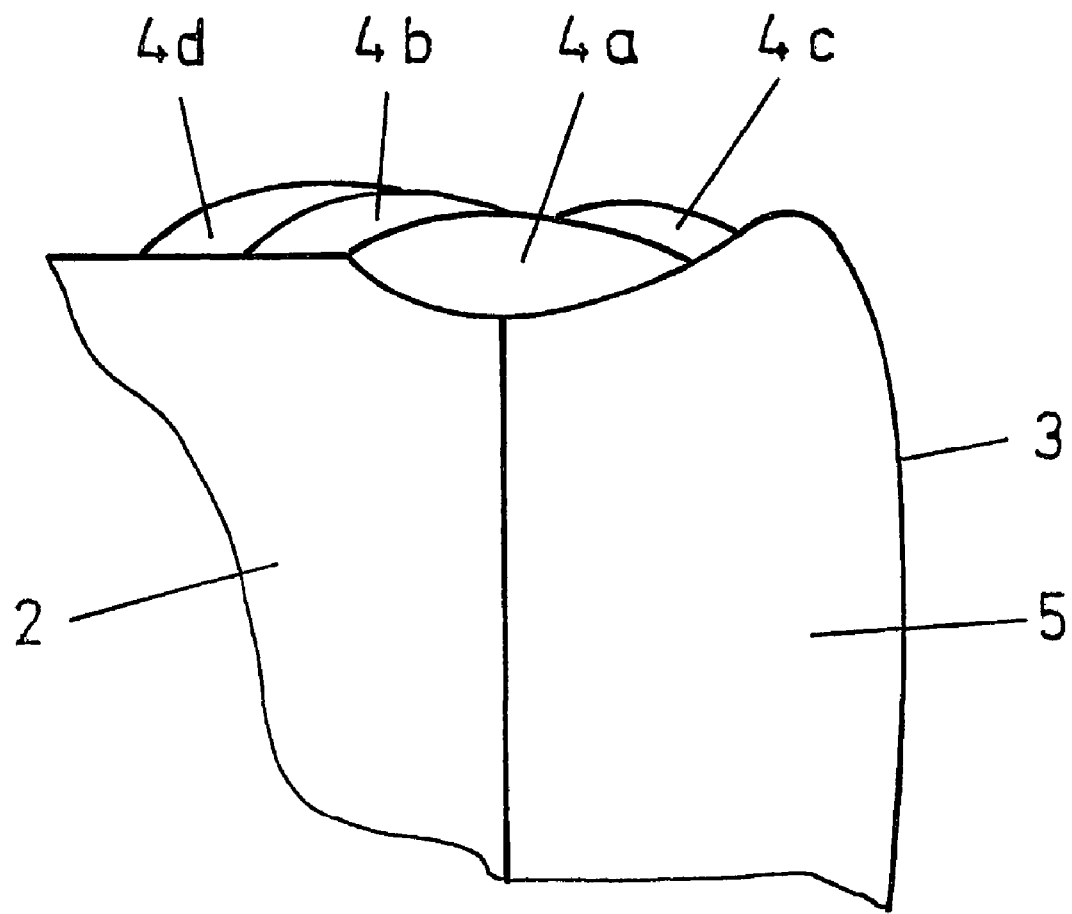

The first weld seam 4a results by guiding laser beams predominantly or entirely onto the annular body 2 by partial melting or fusing of the annular body 2, partial melting or fusing of the cooling channel plate 3, and melting or fusing of the applied stainless steel powder. The second weld seam 4b results from guidance of laser beams along the connection between annular body 2 and first weld seam 4a by partial melting or fusing of the annular body 2, partial melting or fusing of the first weld seam 4a, and melting or fusing of the applied stainless steel powder. The third weld seam 4c results from guidance of laser beams along the connection between cooling channel plate 3 and first weld seam 4a and predominantly or entirely on the first weld seam 4a by partial melting or fusing of the cooling channel plate 3, partial melting or fusing of the first weld seam 4a, and melting or fusing of the stainless steel powder. The fourth weld seam 4d is produced by guidance of laser beams along the connection between annular body 2 and second weld seam 4b and predominantly or entirely on the second weld seam 4b by partial melting or fusing of the annular body 2, partial melting or fusing of the second weld seam 4b, and melting or fusing of the stainless steel powder. FIG. 4 shows a sectional view of a connection location between an end region of a leg of the cooling channel plate 3 and the annular body 2. The quantities of stainless steel powder supplied per weld seam 4 are, in this connection, advantageously and by way of example as follows:

quantity of the first weld seam 4a equals 100%,
quantity of the second weld seam 4b equals 60% of the first weld seam 4a,
quantity of the third weld seam 4c equals 30% of the first weld seam 4a, and
quantity of the fourth weld seam 4d equals 60% of the first weld seam 4a.

The staggering of the laser beams are, in this connection, for example, greater than/equal to 0.1 mm and less than/equal to 0.2 mm. After the positioning of the starting portion of the connection location between the annular body 2 and the cooling channel plate 3, the laser is turned on. In so doing, with simultaneous starting of the movement of the annular body 2, including the cooling channel plate 3, relative to the laser beams, or in one embodiment of the movement of the laser beams relative to the annular body 2, including the cooling channel plate 3, due to the start-up delay of the laser beams connected therewith there result incompletely formed weld seams 4 in this region. The path of movement of the coolable annular support 1, or of the laser beams, is therefore respectively greater than 360°, whereby the starts and the ends of the weld seams 4 are disposed at different locations. The advancement speed of the annular body 2, inclusive of the cooling channel plate 3, is equal to/greater than 20 mm/s and less than/equal to 100 mm/s. A respective tubular body 7 is disposed at or in the opening 6 and is connected via at least one further fifth weld seam 8 produced by laser beams of the laser with the leg of the cooling channel plate 3 in such a way that the cooling channel and the inner space of the tubular body 7 form a common hollow space. In this connection, the end region of the tubular body 7 advantageously projects into the cooling channel. In so doing, the hollow space 5, as a cooling channel of a coolable annular support 1, is accessible via tubular bodies 7. The tubular bodies 7 serve for the guidance of coolant.

Figure 3:
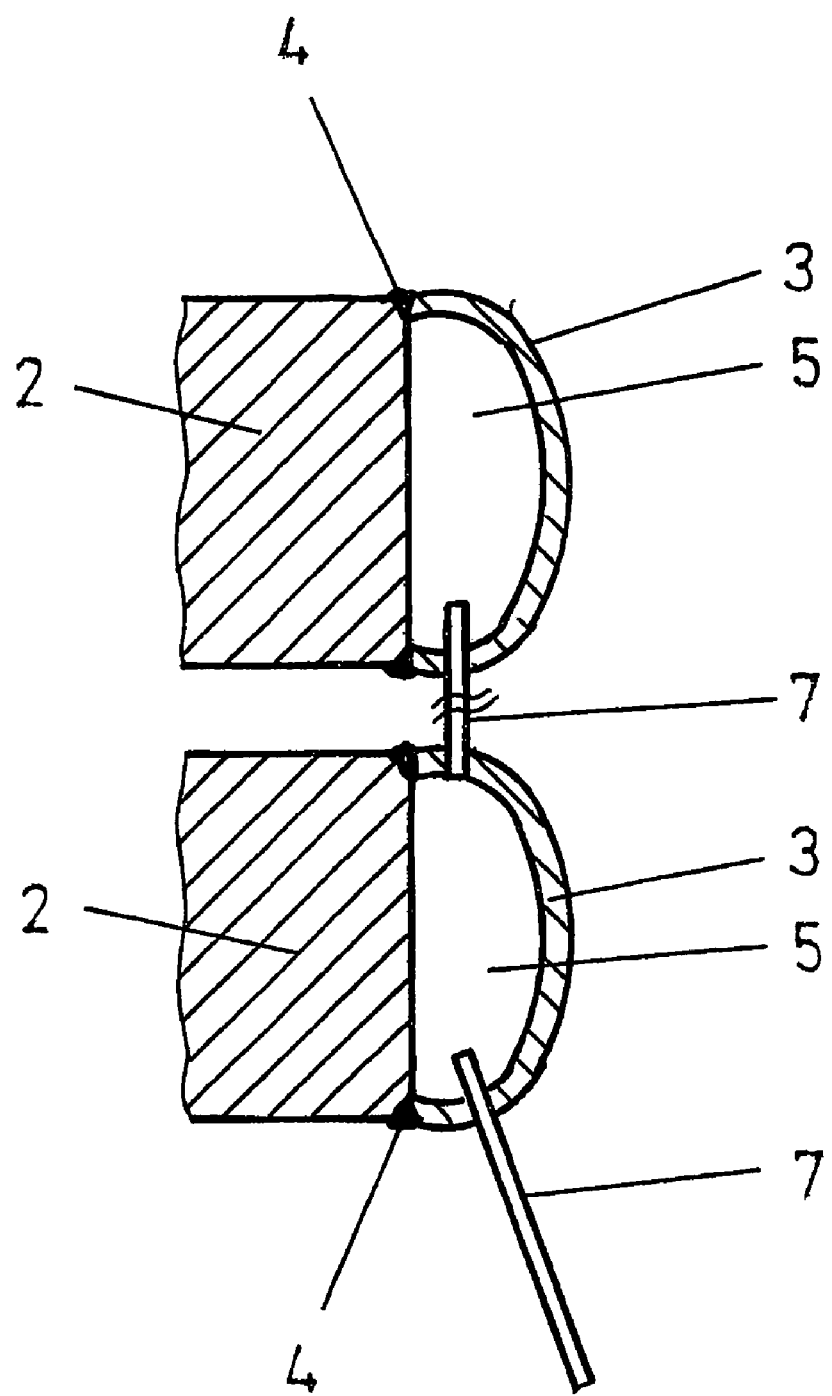

In a further version of the specific embodiments, a plurality of coolable annular supports 1 can be disposed one above the other in such a way that they have a common axis of symmetry (illustration in FIG. 3). The connection of the hollow spaces 5 of the coolable annular supports 1 is effected via tubular bodies 7 between the coolable annular supports 1. This results in a compact unit that can easily be placed in a mold for the piston. The outer coolable annular support 1 that faces in the direction of a crankshaft has outwardly facing and ending tubular bodies 7 that serve for the guidance of the coolant to or from the coolable annular supports 1.

The specification incorporates by reference the disclosure of German priority documents 101 33 724.8 and 201 11 527.1, both filed Jul. 6, 2001, as well as PCT/DE02/02498 filed Jul. 4, 2002.

The present invention is, of course, in no way restricted to the specific disclosure of the specification and drawings, but also encompasses any modifications within the scope of the appended claims.

The invention claimed is:

1. A coolable annular support for internally cooled piston rings, comprising:
   an annular body (2) embodied as a circular ring;
   a cooling channel plate (3) in the form of a circular ring and having a predominantly U-shaped cross-section, wherein said cooling channel plate is provided with openings (6), wherein end portions of legs of said cooling channel plate (3) are respectively connected to edge portions of said annular body (2) by laser beams of at least one laser in a continuous wave operation, accompanied by a supply of metal powder and an inert gas, via overlapping weld seams (4) that are staggered in a direction of said annular body (2) and are each produced with a path of movement of greater than 360°, and wherein said end portions of said legs of said cooling channel plate (3) are connected to said edge portions of said annular body (2) in such a way that said cooling channel plate, and at least a surface of said annular body that delimits an inner space thereof, delimit a hollow space (5) as a cooling channel; and respective tubular bodies (7) or plate-shaped bodies disposed on or in said openings (6) and connected, via at least one further weld seam (8), with said legs of said cooling channel plate (3) in such a way that said cooling channel and an inner space of said tubular bodies (7) form a common hollow space or a closed hollow space is present.

2. A coolable annular support according to claim 1, wherein a plurality of coolable annular supports (1) are disposed symmetrically and parallel to one another, wherein a plurality of tubular bodies (7) are disposed between said coolable annular supports (1), and wherein one of outer ones of said coolable annular supports (1) are provided with outwardly facing tubular bodies (7).

3. A coolable annular support according to claim 1, wherein an end region of a respective tubular body (7) is disposed in said cooling channel in such a way that said end region projects into said cooling channel.

4. A coolable annular support according to claim 1, wherein a connection location between a leg of said cooling channel plate (3), and said annular body (2), is a first weld seam (4a), which is produced by a partial melting or fusing of said annular body (2), partial melting or fusing of the cooling channel plate (3), and a melting or fusing of applied metal powder, and a second weld seam (4b), which is produced by a partial melting or fusing of said annular body (2), a partial melting or fusing of said first weld seam (4a), and a melting or fusing of said applied metal powder, and wherein said second weld seam (4b) is a weld seam that covers cracks and/or gaps in said annular body (2) occurring during a welding of said first weld seam (4a).

5. A coolable annular support according to claim 4, wherein said connection location is furthermore a third weld seam (4c), which is produced by a partial melting or fusing of said cooling channel plate (3), a partial melting or fusing of said first weld seam (4a), and a melting or fusing of said metal powder, and a fourth weld seam (4d), which is produced by a partial melting or fusing of said annular body (2), a partial melting or fusing of said second weld seam (4b), and a melting or fusing of said metal powder, and wherein said second, third, and fourth weld seams (4b, 4c, 4d) are weld seams that cover cracks and/or gaps in said annular body (2) and said cooling channel plate (3) that occur during a welding of said first weld seam (4a).

6. A coolable annular support according to claim 1, wherein starting regions and end regions of said weld seams (4) are disposed at different locations of respective arcs of individual ones of said weld seams.

\* \* \* \* \*